United States Patent
Savinov et al.

(10) Patent No.: US 10,563,731 B2
(45) Date of Patent: Feb. 18, 2020

(54) TRANSMISSION BASED ON GEARS WITH SPIRAL TOOTHED TRANSITIONS

(71) Applicant: LIMITED LIABILITY COMPANY "SCIENTIFIC TECHNICAL COMPANY ALPHA CUBE", St.Petersburg (RU)

(72) Inventors: Maksim Maksimovich Savinov, St.Petersburg (RU); Maksim Vladimirovich Savinov, St.Petersburg (RU)

(73) Assignee: LIMITED LIABILITY COMPANY "SCIENTIFIC TECHNICAL COMPANY ALPHA CUBE", St. Petersburg (RU)

(*) Notice: Subject to any disclaimer, the term of this patent is extended or adjusted under 35 U.S.C. 154(b) by 450 days.

(21) Appl. No.: 15/587,593

(22) Filed: May 5, 2017

(65) Prior Publication Data
US 2017/0234409 A1 Aug. 17, 2017

Related U.S. Application Data

(63) Continuation of application No. PCT/RU2015/000713, filed on Oct. 28, 2015.

(30) Foreign Application Priority Data

Nov. 6, 2014 (RU) .................................. 2014112252

(51) Int. Cl.
*F16H 3/42* (2006.01)
*F16H 63/06* (2006.01)

(52) U.S. Cl.
CPC ............. *F16H 3/423* (2013.01); *F16H 63/06* (2013.01)

(58) Field of Classification Search
CPC .................................. F16H 3/423; F16H 63/06
(Continued)

(56) References Cited

U.S. PATENT DOCUMENTS

| 1,528,574 | A | * | 3/1925 | Schaum | ................. | F16H 3/363 |
| | | | | | | 74/348 |
| 2,697,365 | A | * | 12/1954 | Williams | ................ | F16H 3/423 |
| | | | | | | 475/218 |

(Continued)

FOREIGN PATENT DOCUMENTS

| RU | 2340815 C2 | 12/2008 |
| SU | 1201591 A1 | 12/1985 |

(Continued)

OTHER PUBLICATIONS

International Search Report with regard to PCT/RU2015/000713 (dated Apr. 21, 2016).

(Continued)

*Primary Examiner* — Ha Dinh Ho
(74) *Attorney, Agent, or Firm* — BCF LLP

(57) ABSTRACT

A transmission comprising: a casing having: a first shaft having a truncated cone portion, a second shaft parallel to and spaced away from the truncated cone portion, a first gear mounted on the second shaft, the first gear being configured for rotation with the second shaft, the first gear being in connection with the first shaft, a linear actuator connected to the first gear, the linear actuator allowing to position the first gear at any one of a plurality of positions along the second shaft, the truncated cone portion having, at its beginning and its end, a respective one of a set of gears with a respective diameter and a respective number of teeth being proportionate to a diameter of the truncated cone portion, at least two (Continued)

counter-wound spiral gear tracks extending between the respective one of the set of gear s and another one of the set of gears.

16 Claims, 1 Drawing Sheet

(58) Field of Classification Search
USPC .......................................................... 74/348
See application file for complete search history.

(56) References Cited

U.S. PATENT DOCUMENTS

| | | | | |
|---|---|---|---|---|
| 2,711,105 | A | * | 6/1955 | Williams ................ F16H 3/423 475/218 |
| 3,422,702 | A | * | 1/1969 | Novinger ................ F16H 3/423 475/302 |
| 3,608,390 | A | | 9/1971 | Barrett |
| 3,826,152 | A | | 7/1974 | Alexeev et al. |
| 5,608,390 | A | | 3/1997 | Gasparik |
| 5,653,143 | A | | 8/1997 | Langevin |
| 6,321,613 | B1 | | 11/2001 | Avidor |
| 6,802,229 | B1 | | 10/2004 | Lambert |

FOREIGN PATENT DOCUMENTS

| | | | |
|---|---|---|---|
| SU | 1404700 | A1 | 6/1988 |
| SU | 1495550 | A1 | 7/1989 |

OTHER PUBLICATIONS

English Translation of SU1495550 retrieved on https://translate.google.com/ dated Apr. 26, 2017.
English Translation of SU1404700 retrieved on https://translate.google.com/ dated Apr. 26, 2017.
English Translation of SU1201591 retrieved on https://translate.google.com/ dated Apr. 26, 2017.

* cited by examiner

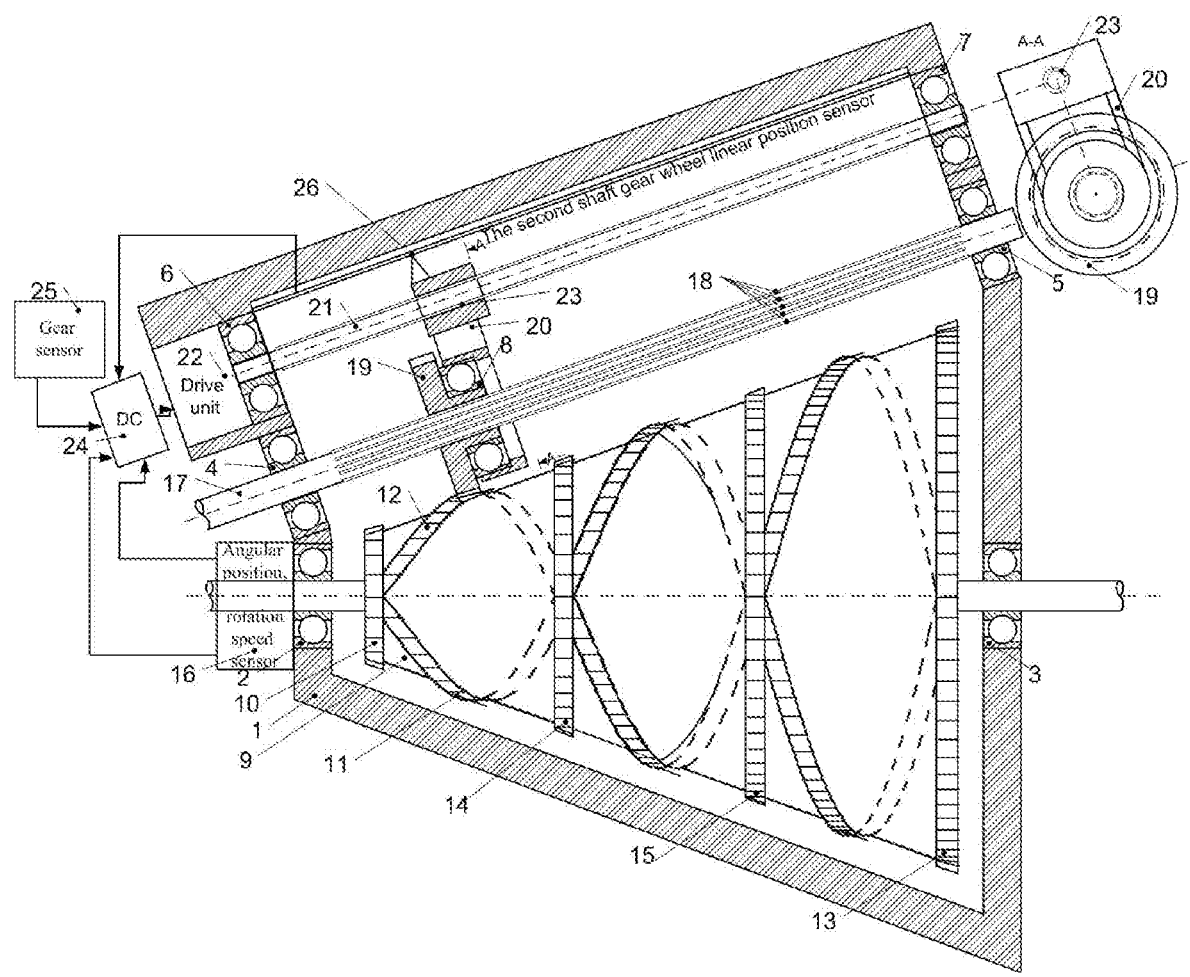

TRANSMISSION BASED ON GEARS WITH SPIRAL TOOTHED TRANSITIONS

CROSS-REFERENCE

The present application claims convention priority to Russian Utility Patent Application No. 2014112252, filed on Nov. 6, 2014, entitled "ТРАНСМИССИЯ НА ШЕСТЕРНЯХ СО СПИРАЛЬНЫМИ ЗУБЧАТЫМИ ПЕРЕХОДАМИ". This application is incorporated by reference herein in its entirety. The present application is a continuation of International Patent Application no. PCT/RU2015/000713, filed on Oct. 28, 2015, entitled "TRANSMISSION BASED ON GEARS WITH SPIRAL TOOTHED TRANSITIONS". This application is incorporated by reference herein in its entirety.

FIELD OF THE INVENTION

The present technology relates to transmissions and more precisely to transmissions with a continuously-stepped variable transmission ratio between the input and the output, i.e. the transmission ratio between adjacent gears or steps may be changed continuously.

BACKGROUND

Transmissions are devices intended for converting rotational speed and torque of a rotational motion source (e.g. a motor) to another device. Three types of transmissions are widely used: mechanical, automatic and continuously variable transmissions (CVT). While geared mechanical and automatic transmissions have a compact size and can transmit a large torque, discretization in the change of transmission ratio requires a torque converter for automatic transmissions that may reduce efficiency, may cause interruptions in torque transmission, and may need a clutch for changing transmission ratios. Furthermore, transmitting torque and power by a rotating continuous belt of variators that can change transmission ratio steplessly and continuously may be difficult.

U.S. Pat. No. 3,608,390 A titled "Variable speed drive" granted to Barrett on Sep. 28, 1971 teaches a variable speed ratio gear system utilizing a conical toothed member made up of an axial stack of gears with varying numbers of teeth, individual gears of the stack consisting of pairs of axially offset pairs, so that the peripheral interface line between adjacent gears has a portion extending generally lengthwise of the conical member.

U.S. Pat. No. 5,653,143 A titled "Automatic mechanical variable ratio transmission" granted to Langevin on Aug. 5, 1997 teaches a variable ratio transmission system for coupling a load to a source of rotational power including a selector shaft having a selector gear axially movable on a fork dolly by an actuator including a lead screw, and a control motor, an inclined cluster shaft having a plurality N of spur gears rotatably supported thereon for being selectively meshed with the selector gear, at least N−1 of the spur gears being variably coupled to the cluster shaft by a one-way clutch for rotation therewith, and a controller for activating the actuator while preventing substantial torque-loading of any of the spur gears unless that spur gear is substantially meshed with the selector gear, the controller comparing a set of operating conditions of the power source with a predetermined operating envelope, and activating the actuator for bringing the set of operating conditions within the operating envelope, the operating conditions including an input operating speed and a set point variable that can be throttle position, torque, power, applied voltage, applied current, modulation duty cycle, or acceleration, the controller being operative for interrupting power from the source for only approximately 0.01 second.

U.S. Pat. No. 6,321,613 B1 titled "Continuously variable transmission" and granted to Avidor on Nov. 27, 2001 teaches a variable ratio transmission for transferring torque between an input port and an output port including two transmission shafts mounted with an angle θ between them. A first of the shafts supports a series of at least two conical gear wheels, of different sizes and having different numbers of gear teeth, in such a manner as to define a predefined range of angular motion through which each conical gear can turn relative to its shaft. The conical gear wheels together define a conical external profile at an angle θ to the first axis. A sliding gear wheel, configured for driving engagement with any one of the conical gear wheels, is engaged so as to slide along, and yet rotate together with, the second transmission shaft. An actuator displaces the sliding gear wheel along the second transmission shaft parallel to the second axis between positions corresponding to selective engagement with each of the conical gears, thereby varying a drive ratio between the first and second transmission shafts.

Russian Federation Patent No. 2,340,815 (also granted as U.S. Pat. No. 6,802,229 B1) titled "Gear drive having continuously variable drive ratio" and granted to Lambert teaches a continuously variable drive ratio transmission including a support, a first shaft rotatably mounted to the support so that shaft can rotate about a first axis, a helical rack supported by the first shaft so that the rack has a plurality of toothed convolutions facing away from and spaced apart along the first shaft, the diameters of said convolutions being such that together they define a conical envelope encircling the first shaft. A second shaft is rotatably mounted to the support so that the second shaft is spaced from and extends parallel to the envelope, and a gear member is mounted to the second shaft for rotation therewith, the gear member having teeth which mesh with those of the rack. The gear member is slidable along the second shaft so that the gear member may be positioned at any location along the rack.

However, such transmissions may have shortcomings: the second shaft gear being at arbitrary positions along the length of the shaft while in rotation may engage with one and then another turn of the rack, resulting in tooth engagement area and, respectively, maximum transmitted torque that may have variable values. i.e. at certain shaft positions loads acting on the edges of the gear teeth of the first shaft and the second shaft may cause a failure. Furthermore, two second shaft gear wheels rotating elastically against each other do not ensure a distinct and definite engagement when changing from one gear transition coil to another. This may result in increased wear, teeth failure or jamming of the transmission.

Therefore, there is a need for a spiral gear transmission.

SUMMARY

It is an object of the present technology to ameliorate at least some of the inconveniences of the prior art.

The present technology allows a stepless and continuous transmission ratio and rotation torque variation in the process of switching between the stationary gear wheels of a truncated conical shaft, the stationary gear wheels functioning as different transmission steps.

The present technology allows a continuous change of transmission ratio between gear transmissions (including adjacent ones) without rotation torque interruption. Transmission ratio change may have a small increment at a large number of transmission stages.

Furthermore, the truncated conical shaft of the present technology, like the transmission as a whole, may perform the function of an engine flywheel since the rotation torque is transmitted continuously and the transmission may have a large moment of inertia. In addition, there is no need to use a clutch when switching between transmission stages.

According to an aspect of the present technology, there is provided a spiral gear transmission comprising: a casing having: a first rotating shaft, the first rotating shaft having a truncated cone portion, a second rotating shaft located parallel to and spaced away from the truncated cone portion, a first gear wheel slidably mounted on the second rotating shaft, the first gear wheel being configured for rotation with the second rotating shaft, the first gear wheel being in a driven connection with the first rotating shaft, a linear actuator operatively connected to the first gear wheel, the linear actuator allowing to position the first gear wheel at any one of a plurality of positions along the second rotating shaft, the truncated cone portion having, at its beginning and its end, a respective one of a set of gear wheels, a diameter and a number of teeth of respective one of the set of gear wheels being proportionate to a diameter of the truncated cone portion at a respective location of the respective one of the set of gear wheels, at least two counter-wound spiral gear tracks extending between the respective one of the set of gear wheels and another one of the set of gear wheels, the linear actuator being configured move the first gear wheel between the set of gear wheels along the at least two counter-wound spiral gear tracks without changing a direction or rotation of the first rotating shaft thereby changing a transmission coefficient.

In some implementations, the spiral gear transmission further comprises an additional set of gear wheels located at least one respective intersection point of the at least two counter-wound spiral gear tracks.

In some implementations, the first gear wheel is slidably mounted onto the second rotating shaft using one of: longitudinal slots, splines or teeth located on the second rotating shaft.

In some implementations, intersecting portions of the at least two counter-wound spiral gear tracks define therebetween a variable radius cone gear that is configured to cause a change in the transmission coefficient and a rotation torque in a step-less and continuous manner throughout a transmission coefficient range.

In some implementations, each one of the at least two counter-wound spiral gear tracks has a respective number of teeth, the first gear wheel has a first number of teeth and each one of the additional set of gear wheels has a respective number of teeth.

In some implementations, the respective number of teeth of the at least two counter-wound spiral gear tracks, the first number of teeth, the respective number of teeth of the additional set of gear wheels and the number of teeth of the respective one of the set of gear wheels located at the beginning and the end of the truncated cone are the same.

In some implementations, the respective teeth of the at least two counter-wound spiral gear tracks, the respective teeth of the additional set of gear wheels and the teeth of the respective one of the set of gear wheels located at the beginning and the end of the truncated cone are recessed in the truncated cone portion, edges of the teeth being configured to guide movement of the first gear wheel along the at least two counter-wound spiral gear tracks.

In some implementations, the spiral gear transmission further comprises a device for maintaining a force by pressing the first rotating shaft and the first gear wheel if a straight line connecting a longitudinal section of one of the teeth of the respective one of the set of gear wheels located at the beginning and the end of the truncated cone, the additional set of gear wheels located at the least one respective intersection point of the at least two counter-wound spiral gear tracks is parallel to a rotational axis of the first rotating shaft.

In some implementations, a length of a respective segment of each one of the at least two counter-wound spiral gear tracks between the respective gear wheels is one of: a constant length, the length of the respective segment being constant between the respective gear wheels, or a variable length, the variable length thereby allowing each one of the respective one of the set of gear wheels located at the beginning and the end of the truncated cone and the additional set of gear wheels located on at the least one respective intersection point of the at least two counter-wound spiral gear to have a respective arbitrary diameter and the respective number of teeth depending on the diameter of truncated cone at their respective locations.

In some implementations, the spiral gear transmission further comprises a sensor-based automatic control system operatively connected to the linear actuator and to the first gear wheel on the second rotating shaft such that the first number of teeth of the first gear wheel are permanently engaged with one of: the respective one of the set of gear wheels located at the beginning and the end of the truncated cone, the additional set of gear wheels located at the least one respective intersection point of the at least two counter-wound spiral gear tracks on the first rotating shaft or with the respective teeth of the at least two counter-wound spiral gear tracks when the transmission coefficient is changed.

In some implementations, a number of additional gear wheels of the additional set of gear wheels are slidably mounted on the first rotating shaft, the number of additional gear wheels being selected based on a length of the first rotating shaft and a dimension of each one of the teeth of: the respective one of the set of gear wheels located at the beginning and the end of the truncated cone, the additional set of gear wheels located at the least one respective intersection point of the at least two counter-wound spiral gear tracks on the first rotating shaft.

In some implementations, a shape of teeth of the at least two counter-wound spiral gear tracks on the first rotating shaft for transmitting rotation between the first rotating shaft and the second rotating shaft are an imprint of a shape of teeth of the first gear wheel of the second rotating shaft.

In some implementations, the first rotational axis of the first rotational shaft and the second rotational axis of the second rotational shaft are parallel, and the transmission further comprises: a slide coupled to the second shaft by a universal-joint drive, the slide being configured for moving in parallel to the first shaft, the slide containing the first gear wheel.

In some implementations, either one of the first rotating shaft and the second rotating shaft is a transmission input shaft, and another one of the first rotating shaft and the second rotating shaft is a transmission output shaft.

In some implementations, the spiral gear transmission further comprises: a plurality of rotational shafts located around the truncated cone portion, each rotational shaft of the plurality of rotational shafts having an automatic control system, a linear actuator and a gear wheel, each rotational shaft of the plurality of rotational shafts operating independently and having a rotational speed determined by the automatic control system of each rotational shaft of the plurality of rotational shafts.

In some implementations, the truncated cone portion is of an arbitrary length, the arbitrary length including a length of zero, the length of zero corresponding to the truncated cone portion being a disc having the respective number of teeth of one of the set of gear wheels located at the beginning and the end of the truncated cone, of the additional set of gear wheels located at the least one respective intersection point of the at least two counter-wound spiral gear tracks on the first rotating shaft and of the at least two counter-wound spiral gear tracks located thereon and where a rotational axis of the second rotating shaft is parallel to the disc.

According to an aspect of the present technology, there is provided a spiral gear transmission, comprising: a casing, a first rotating shaft mounted through the casing about a first rotational axis and having a truncated cone portion concentric with the first rotational axis, a second rotating shaft mounted through the casing about a second rotational axis that is parallel to and spaced away from the truncated cone portion, a first gear wheel slidably mounted onto the second rotating shaft, and being in a driven connection with the second rotating shaft and the truncated cone portion to transmit rotation between the first rotating shaft and the second rotating shaft, and a linear actuator operatively connected between the casing and the first gear wheel to position the first gear wheel to a plurality of positions along the second rotating shaft, the truncated cone portion having: a first end, a second end opposed to the first end, a first diameter that increases from the first end toward the second end, at least two counter-wound spiral gear tracks extending between the first end and the second end, a second gear wheel positioned concentric with the first rotational axis proximate to the first end of the truncated cone portion and having a second diameter and a second number of teeth, each of the second diameter and the second number of teeth being proportional to the first diameter at the second gear wheel, and a third gear wheel positioned concentric with the first rotational axis proximate the second end of the truncated cone portion and having a third diameter and a third number of teeth, each of the third diameter and the third number of teeth being proportional to the first diameter at the third gear wheel, and a fourth gear wheel positioned between the second gear wheel and the third gear wheel, and a fifth gear wheel positioned between the fourth gear wheel and the third gear wheel, and the second gear wheel, the third gear wheel, the fourth gear wheel and the fifth gear wheel being interconnected by the at least two spiral gear tracks such that: a) the plurality of positions along the second rotating shaft includes: i) a first position in which the first gear wheel rotationally engages the second gear wheel, and ii) a second position in which the first gear wheel rotationally engages the third gear wheel, and iii) a third position in which the first gear wheel rotationally engages the fourth gear wheel and iv) a fourth position in which the first gear wheel rotationally engages the fifth gear wheel b) the first gear wheel is movable by the linear actuator on the at least two spiral gear tracks from the first position to the second position, from the second position to the third position, from the third position to the fourth position while the first rotating shaft is rotating in a given direction, and from the fourth position to the third position, from the third position to the second position, and from the second position to the first position while the first rotating shaft is rotating in the given direction, thereby changing the transmission coefficient.

According to an aspect of the present technology, there is provided a spiral gear transmission comprising: a casing with a first rotating shaft, the first rotating shaft having a first diameter and a truncated cone portion, the truncated cone portion having a surface, a first end, a second end, and at least two counter-wound spiral gear tracks extending between the first end and the second end, a second rotating shaft installed parallel to and spaced away from the truncated cone portion, a first gear wheel slidably mounted on the second rotating shaft being in a driven connection with the first rotating shaft and rotating together with the first rotating shaft, a linear actuator operatively connected between the casing and the first gear wheel, the linear actuator allowing to position the first gear wheel at a plurality of positions along the second rotating shaft, a second gear wheel, a third gear wheel, a fourth gear wheel and a fifth gear wheel slidably mounted on the first rotating shaft: the second gear wheel being positioned proximate to the first end of the truncated cone and having a second diameter and a second number of teeth, the third gear wheel being positioned proximate to the second end of the truncated cone and having a third diameter and a third number of teeth, the fourth gear wheel being positioned between the second gear wheel and the third gear wheel, the fifth gear wheel being positioned between the fourth gear wheel and the third gear wheel, the second diameter and the second number of teeth, and the third diameter and the third number of teeth being respectively proportional to the first diameter of the first rotating shaft respectively at the second gear wheel and the third gear wheel and being connected by the at least two counter-wound spiral gear tracks, and wherein a transmission coefficient is changed by the linear actuator moving the first gear wheel on the at least two counter-wind spiral tracks to one of the plurality of positions including: a first position where the first gear wheel engages the second gear wheel, a second position where the first gear wheel engages the third gear wheel, a third position where the first gear wheel engages the fourth gear wheel, a fourth position where the first gear wheel engages the fifth gear wheel, and wherein the linear actuator moves the first gear wheel to the first position, the second position, the third position and the fourth position without changing a rotation direction of the first rotating shaft.

According to an aspect of the present technology, there is provided a transmission based on gear wheels with spiral toothed transitions includes a first truncated conical shaft with gear wheels located at its beginning and end. The number of teeth of the gear wheels is proportionate to the truncated cone diameter at the point of their location, the adjacent gear wheels are connected by two contrawound spiral toothed transitions. Gear wheels may be located at the points of intersection of those transitions as well, their diameters and the number of their teeth are proportionate to the truncated cone diameter at their locations. Two contrawound spiral toothed transitions are needed for increasing and reducing the transmission ratio without changing the rotation direction of the first shaft. Thereby, we have a truncated conical shaft with a number of gears connected with spiral toothed transitions between them. A second shaft with a gear wheel on it is installed in parallel to the surface of the truncated cone. The gear wheel may move along the shaft but is fastened on it so that it rotates together with it. The gear wheel is moved along the second shaft and, respectively, along the truncated conical shaft by a mechanical or electronic control system that monitors and locates the linear position of the gear wheel on the second shaft, the angular position of and rotation speed of the first shaft, takes into account the starting and ending points of the spiral toothed transitions and allows for the need for an increase or decrease in the transmission ratio, possibly the shaft load value and other necessary parameters. Thereby, a change in transmission ratio is achieved by rolling the gear wheel on the second shaft along the spiral toothed transitions from one gear wheel on the first shaft to another. Such rolling is performed by a control system at calculated points in time when the gear wheel on the second shaft is located opposite to the beginning of a spiral toothed transition. The control system has a longitudinal actuating mechanism for moving the gear wheel along the second shaft. A transmission of such type is reversible, both the first and the second shaft may be the input and the output one. A length of a segment of the spiral may be both the same for each segment between gears or variable. The truncated cone surface of the first shaft may differ in shape from a truncated cone but nevertheless include all the toothed elements needed for operation. The module of the teeth of the gears (10, 13, 14, 15) may be the same everywhere. The teeth of the gear wheels and spiral toothed transitions may be sunken into the truncated cone surface, allowing the second shaft gear wheel to roll on them like on guides. In this case, the control system is simplified, it can even be mechanical. If the truncated conical shaft teeth are sunken, it is enough to guide the second shaft gear wheel onto a spiral toothed transition, after this, the transmission ratio will be changed automatically.

To ensure a large contact area between engaged teeth of the first shaft and the second one, the teeth can have any shape. The shape of the truncated conical shaft teeth may repeat the imprints of the second shaft teeth changing their position in space. Conical shaft teeth having such a shape may be cut by a gear cutter having an appropriate profile that would imitate rotation of the engaged second shaft gear wheel and the truncated conical shaft teeth in the process of cutting teeth on the truncated conical shaft. The shape of imprint created by the gear cutter will allow to ensure a large tooth contact area at any relative angular position of the truncated conical shaft teeth and the second shaft gear wheel teeth. Whereupon different conicity of teeth at the beginning and at the end of the truncated conical shaft will not influence the maximum value of rotation torque transmitted by the teeth. Apart from toothed gears, more efficient rotation transmission types may be used for such type transmissions, e.g., eccentric-cycloidal transmission. The specific feature of using such type of transmission is that the second shaft axis must be parallel to the first shaft axis and not the conical surface, i.e., the first and the second shaft must be coaxial. A mobile cardan suspension may be used for that purpose. I.e., the slide including the second shaft moves along guide rails parallel to the surface of the cone while the axis of the second shaft is parallel to the axis of the truncated conical shaft and rotation torque is transmitted to the second shaft through a cardan drive traveling in relation to the gear wheel to which the rotation toque is transmitted or from which it is taken. Such a type of rotation torque transmission from the first shaft to the second one may be used for toothed gears as well.

A transmission may also include one or several second shafts for power takeoff, operating at the first truncated conical shaft independently of each other, as well as their respective automatic control system, actuating mechanisms and second shaft gear wheels each of which operates independently and rotates at a speed determined by its own control system. Summing different rotation speeds of one or several second shafts and contrarotation speed of the truncated conical shaft with the help of known summing mechanisms subject to tooth numbers selection may ensure a combination set of resultant rotation speeds differing in value and direction, including a zero resultant rotation speed.

The truncated conical shaft may have any length, including zero length. Whereupon the truncated conical shaft is transformed into a flat wheel with gear wheel teeth and teeth of spiral toothed transitions situated thereon, and the second shaft rotation axis becomes parallel to the wheel plane and perpendicular to the wheel rotation axis.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 is longitudinal section view of a spiral gear transmission implemented in accordance with non-limiting embodiments of the present technology.

DETAILED DESCRIPTION

FIG. 1 shows longitudinal section view of the transmission. The transmission includes a casing 1 drawn in a longitudinal section, with sets of bearings 2-8. The sets of bearings 2 and 3 are installed in casing 1, operatively connected to a truncated conical shaft 9. The truncated conical shaft 1 includes a first stationary gear wheel 10 located at the beginning of the truncated conical shaft 9 and a second stationary gear wheel 13 located at the end of the truncated conical shaft 9. The numbers of teeth on the stationary gear wheels 10, 13 are chosen proceeding from the necessary transmission ratio variation range. Stationary gear wheels on truncated conical shaft 9 may be also installed at the points of conventional intersection of two contrawound spiral toothed transitions 11 and 12.

In general, the number of intersections and, respectively, intermediate gear wheels may be arbitrary, allowing to reduce the transmission ratio discretization interval, but with limits from the top imposed by the sizes of teeth and the length of truncated conical shaft 9. The diameters and number of teeth of those gear wheels increase from the narrow end of truncated conical shaft 9 to the broad one. Whereupon the length of a half-turn of the spiral toothed transitions may be the same or vary between stationary gear wheels. i.e., the diameters of stationary gear wheels on the truncated conical shaft located at the intersections of the spiral toothed transitions are not determined by the length of a half-turn of the spiral toothed transitions but may vary at the design stage, allowing to set the necessary diameters and tooth numbers of intermediate gear wheels.

The shape of shaft 9 may differ from the truncated conical shape but the shaft 9 must include the toothed elements needed for its operation. Thereby, the truncated conical shaft includes a certain number N of stationary gear wheels—there are four of them in FIG. 1: gear wheels 10, 13, 14 and 15 whose tooth numbers are proportionate to the truncated cone diameter at their location. Two or more contrawound spiral toothed transitions 11 and 12 that need not be continuous are needed for changing the transmission ratio upward or downward without changing the direction of the truncated conical shaft rotation.

The tooth module of the spiral toothed transitions and all gear wheels is the same. The teeth of the spiral conical gear transitions are directed away from the truncated conical shaft and in general are parallel to the axis of the second shaft. In some embodiments of the present technology, there are sensors 16 installed on the truncated conical shaft 9: the shaft angular position sensor needed for monitoring the angular positions of the teeth of the spiral toothed transitions, the truncated conical shaft rotation speed sensor and, possibly, the shaft load sensor.

The transmission in FIG. 1 includes a second shaft 17 located parallel to the surface of the truncated conical shaft 9 at some distance from it. The second shaft 17 is mounted in the casing 1 by means of the sets of bearings 4 and 5. The second shaft 17 is provided with keys or splines 18 stretching along it and rotating together with the second shaft.

A gear wheel 19 is installed on the second shaft 17 and rotates together with it because of splines, keys or teeth 18; but it can also move along the second shaft so that the teeth of the gear wheel 19 are permanently engaged with the teeth of the truncated conical shaft gear wheels 10, 13, 14, 15 or spiral toothed transitions 11 and 12 when they are aligned. Shafts 19 and 17 may act both as input and output shafts. The second shaft gear wheel 19 moves along the shaft 17 with the help of sliding member 20 connected with the gear wheel with the help of bearing 8.

The longitudinal movement of the sliding member 20 is effected with the help of an actuating mechanism. The actuating mechanism is shown in FIG. 1 as a threaded shaft 21 of an actuating drive 22 mounted in the casing 1 on bearings 5 and 6. The sliding member includes threads 23. As the shaft 21 rotates in a clockwise or a counterclockwise direction, it causes the sliding member 20 to move forward or backward and, respectively, causes the gear wheel 19 to move along the truncated conical shaft 9.

The linear position of the sliding member 20 is monitored by a linear motion sensor 24. The linear position of gear wheel 19 in relation to shaft 21 at specific points in time needed to roll from one stationary gear wheel of the shaft 9 to another may be calculated by a digital computer (DC) 24. Any other known mechanism may be also used for moving the gear wheel 19 longitudinally along the truncated conical shaft. e.g., the teeth of the gear wheels and spiral toothed transitions may be sunken into the truncated conical shaft 9. Whereupon for the gear wheel 19 to roll from one stationary gear wheel on the truncated conical shaft to the other, it must be preliminarily placed into a spiral toothed transition groove or connected to shafts with two contrawound threads rotated by the truncated conical shafts at necessary points in time for necessary time intervals, other known methods may be used as well.

The DC 24 uses the selected gear sensor 25 for operation. It specifies which stationary gear wheel on the truncated conical shaft 9 must be engaged with the second shaft gear wheel 19; this sensor may be integrated into the DC 24. The DC 24 calculates the required linear positions of the gear wheel 19 at certain points in time when switching to a desired stationary gear wheel on the shaft 9 from the current stationary gear wheel on the ground of the current position of the gear wheel 19 along the second shaft monitored with the help of linear travel sensor 26, as well as shaft rotation speed sensors, and shaft angular position sensors.

Using these parameters and, possibly, the truncated conical shaft load level data received from the sensor 16, the DC 24 generates necessary control signals for the actuator 22 and calculates the gear shift beginning time when teeth of the gear wheel 19 will be aligned with the beginning of a spiral toothed transition. Actuator 22 rotates the threaded shaft 21, moves the sliding member 20 and also the second shaft gear wheel 19 along the shaft 17 so that during gear shifting the gear wheel 19 is permanently engaged with the teeth of the spiral toothed transitions on the shaft 9 until the position of the stationary gear wheel on shaft 9 set by the gear sensor 25 is reached.

The DC 24 determines the angular speed of actuator shaft 22 $\bar{\omega}_1$ in radians per second with regard for the fact that the gear must be shifted during the time needed for the truncated conical shaft to turn by a half-turn and the initial moment of its actuation $t_0$ with the help of the following simplified formulas:

$\bar{\omega}_1 = 8\pi^2 l / d\bar{\omega}$, where l is the linear length of the spiral toothed transition plus the width of the stationary gear wheel on shaft 9 monitored by the linear position sensor of second shaft gear wheel 26, d is the thread pitch 23 of shaft 21, $\bar{\omega}$ is the truncated conical shaft 9 angular rotation speed in radians per second, $t_0 = (\alpha_0 - \alpha)/\bar{\omega}$, where $\alpha_0$ is the angle of the beginning of the spiral toothed transition in radians whose value may be adopted as equal to $2\pi$, $\alpha$ is the current angular position of the truncated conical shaft 9 in radians.

In some embodiments of the present technology, the control system is implemented as an automatic control system. As gears are shifted on the ground of the values calculated by the DC 24, the current linear position of the shaft 19 is also monitored by the sensor 26. The calculated linear position of the gear wheel 19 along the shaft 17 and the current one are constantly compared in the process of gear shifting, and when a misalignment exceeding a preset permissible value is detected, an additional corrective signal is generated for actuator 22, allowing to compensate the detected misalignment.

This automatic control system is one of the measures protecting the transmission from the gear wheel 19 jumping off the spiral toothed transitions 11 and 12 of the shaft 9 at the moments when the transmission transmission ratio is changed. Wider spiral toothed transitions can be also used for prevention of jumping off. They will also allow to prevent the gear wheel 19 from jumping off the shaft 9 during gear shifting in case of possible fluctuations of load on the shaft 9. Blocking of shaft load fluctuations during transmission ratio changes can be used as another preventive measure. The transmission automatic control system can "learn" in order to prevent gear wheel jumping off. This "learning" consists in changing some transmission parameters in the course of time—e.g., the force needed to change the gear wheel 19 linear position, and the control system may monitor permanent deviations from the calculated values and adjust itself, i.e. correct its operation in view of wear and tear causing changes in parameters. Since there may be a significant number of stationary gear wheels on the truncated conical shaft 9, the transmission transmission ratio gaps may be small.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A spiral gear transmission comprising:
a casing having:
a first rotating shaft, the first rotating shaft having a truncated cone portion, and
a second rotating shaft located parallel to and spaced away from the truncated cone portion;
a first gear wheel slidably mounted on the second rotating shaft, the first gear wheel being configured for rotation with the second rotating shaft, the first gear wheel being in a driven connection with the first rotating shaft;
a linear actuator operatively connected to the first gear wheel, the linear actuator allowing to position the first gear wheel at any one of a plurality of positions along the second rotating shaft;
the truncated cone portion having, at its beginning and its end, a respective one of a set of gear wheels, a diameter and a number of teeth of respective one of the set of gear wheels being proportionate to a diameter of the truncated cone portion at a respective location of the respective one of the set of gear wheels;
at least two counter-wound spiral gear tracks extending between the respective one of the set of gear wheels and another one of the set of gear wheels; and
the linear actuator being configured to move the first gear wheel between the set of gear wheels along the at least two counter-wound spiral gear tracks without changing a direction or rotation of the first rotating shaft thereby changing a transmission coefficient.

2. The spiral gear transmission of claim 1, further comprising an additional set of gear wheels located at at least one respective intersection point of the at least two counter-wound spiral gear tracks.

3. The spiral gear transmission of claim 1, wherein the first gear wheel is slidably mounted onto the second rotating shaft using one of: longitudinal slots, splines or teeth located on the second rotating shaft.

4. The spiral gear transmission of claim 1, wherein intersecting portions of the at least two counter-wound spiral gear tracks define therebetween a variable radius cone gear that is configured to cause a change in the transmission coefficient and a rotation torque in a step-less and continuous manner throughout a transmission coefficient range.

5. The spiral gear transmission of claim 2, wherein each one of the at least two counter-wound spiral gear tracks has a respective number of teeth, the first gear wheel has a first number of teeth and each one of the additional set of gear wheels has a respective number of teeth.

6. The spiral gear transmission of claim 5, wherein the respective number of teeth of the at least two counter-wound spiral gear tracks, the first number of teeth, the respective number of teeth of the additional set of gear wheels and the number of teeth of the respective one of the set of gear wheels located at the beginning and the end of the truncated cone are the same.

7. The spiral gear transmission of claim 5, wherein the respective teeth of the at least two counter-wound spiral gear tracks, the respective teeth of the additional set of gear wheels and the teeth of the respective one of the set of gear wheels located at the beginning and the end of the truncated cone are recessed in the truncated cone portion; edges of the teeth being configured to guide movement of the first gear wheel along the at least two counter-wound spiral gear tracks.

8. The spiral gear transmission of claim 5, further comprising
a device for maintaining a force by pressing the first rotating shaft and the first gear wheel if a straight line connecting a longitudinal section of one of the teeth of the respective one of the set of gear wheels located at the beginning and the end of the truncated cone, the additional set of gear wheels located at the at least one respective intersection point of the at least two counter-wound spiral gear tracks is parallel to a rotational axis of the first rotating shaft.

9. The spiral gear transmission of claim 5, wherein a length of a respective segment of each one of the at least two counter-wound spiral gear tracks between the respective gear wheels is one of:
a constant length, the length of the respective segment being constant between the respective gear wheels, or
a variable length, the variable length thereby allowing each one of the respective one of the set of gear wheels located at the beginning and the end of the truncated cone, the additional set of gear wheels located on at the least one respective intersection point of the at least two counter-wound spiral gear tracks on the first rotating shaft to have a respective arbitrary diameter and the respective number of teeth depending on the diameter of the truncated cone at their respective locations.

10. The spiral gear transmission of claim 5, further comprising a sensor-based automatic control system operatively connected to the linear actuator and to the first gear wheel on the second rotating shaft such that the first number of teeth of the first gear wheel are permanently engaged with one of: the respective one of the set of gear wheels located at the beginning and the end of the truncated cone, the additional set of gear wheels located at the at least one respective intersection point of the at least two counter-wound spiral gear tracks on the first rotating shaft or with the respective teeth of the at least two counter-wound spiral gear tracks when the transmission coefficient is changed.

11. The spiral gear transmission of claim 5, wherein a number of additional gear wheels of the additional set of gear wheels are slidably mounted on the first rotating shaft, the number of additional gear wheels being selected based on a length of the first rotating shaft and a dimension of each one of the teeth of: the respective one of the set of gear wheels located at the beginning and the end of the truncated cone, the additional set of gear wheels located at the least one respective intersection point of the at least two counter-wound spiral gear tracks on the first rotating shaft.

12. The spiral gear transmission of claim 1, wherein a shape of teeth of the at least two counter-wound spiral gear tracks on the first rotating shaft for transmitting rotation between the first rotating shaft and the second rotating shaft are an imprint of a shape of teeth of the first gear wheel of the second rotating shaft.

13. The spiral gear transmission of claim 1, wherein a first rotational axis of the first rotational shaft and a second rotational axis of the second rotational shaft are parallel, the transmission further comprising:
a slide coupled to the second shaft by a universal-joint drive,
the slide being configured for moving in parallel to the first shaft, the slide containing the first gear wheel.

14. The spiral gear transmission of claim 1, wherein
  either one of the first rotating shaft and the second rotating shaft is a transmission input shaft; and
  another one of the first rotating shaft and the second rotating shaft is a transmission output shaft.

15. The spiral gear transmission of claim 1, further comprising:
  a plurality of rotational shafts located around the truncated cone portion, each rotational shaft of the plurality of rotational shafts having an automatic control system, a linear actuator and a gear wheel, each rotational shaft of the plurality of rotational shafts operating independently and having a rotational speed determined by the automatic control system of each rotational shaft of the plurality of rotational shafts.

16. The spiral gear transmission of claim 5, wherein the truncated cone portion is of an arbitrary length, the arbitrary length including a length of zero, the length of zero corresponding to the truncated cone portion being a disc having the respective number of teeth of one of the set of gear wheels located at the beginning and the end of the truncated cone, of the additional set of gear wheels located at the least one respective intersection point of the at least two counter-wound spiral gear tracks on the first rotating shaft and of the at least two counter-wound spiral gear tracks located thereon and where a rotational axis of the second rotating shaft is parallel to the disc.

* * * * *